United States Patent [19]
Pomeisl

[11] Patent Number: 5,503,130
[45] Date of Patent: Apr. 2, 1996

[54] INTERNAL COMBUSTION ENGINE WITH IMPROVED EXHAUST VALVE, TIMING SYSTEM, AND INJECTOR

[76] Inventor: James R. Pomeisl, 4917 Ballantine Dr., Las Vegas, Nev. 89110

[21] Appl. No.: 337,176

[22] Filed: Nov. 10, 1994

[51] Int. Cl.[6] .................................................. F02M 23/00
[52] U.S. Cl. ...................... 123/533; 123/146.5 A; 123/190.1
[58] Field of Search ................... 123/190.1, 190.2, 123/146.5 A, 533, 585; 261/50.1, DIG. 74

[56] References Cited

U.S. PATENT DOCUMENTS

| | | | |
|---|---|---|---|
| 873,963 | 12/1907 | Slocum | 123/190.1 |
| 957,713 | 5/1910 | Rapp | 123/146.5 A |
| 1,435,787 | 11/1922 | Arschauloff | 123/532 |
| 2,016,062 | 10/1935 | Vigers | 123/81 C |
| 2,197,107 | 4/1940 | Kammer | 123/65 VF |
| 2,203,669 | 6/1940 | Butler | 123/532 |
| 2,230,920 | 2/1941 | Wirtsen | 123/435 |
| 3,587,550 | 6/1971 | Zechlin | 123/146.5 A |
| 4,201,160 | 5/1980 | Fenne | 123/300 |
| 4,201,174 | 5/1980 | Vallejos | 123/190.2 |
| 4,765,287 | 8/1988 | Taylor et al. | 123/315 |
| 4,771,754 | 9/1988 | Reinke | 123/533 |
| 4,810,967 | 3/1989 | Yokoyama et al. | 123/146.5 A |
| 4,838,214 | 6/1989 | Barrett | 123/41.69 |
| 5,156,133 | 10/1992 | Sugimoto et al. | 123/533 |
| 5,205,120 | 4/1993 | Oblander et al. | 60/284 |

*Primary Examiner*—Noah P. Kamen
*Attorney, Agent, or Firm*—Quirk & Tratos

[57] ABSTRACT

An internal combustion engine is provided which includes an improved exhaust valve, air/fuel injector, and timing system for operating the valves and injectors. The exhaust valve comprises a rotatable cylindrical valve body having a passage which is located in an exhaust passage. The valve body is actuated by linkage connected to an electronically controlled solenoid. The air/fuel injector comprises a housing having air and fuel reservoirs having orifices therein and an air and fuel needle for selective location each the respective orifices. Air and fuel passing through the orifices is mixed in a venturi and then passes through a screen and check valve into the cylinder. The timing mechanism is connected to the injector and valve and comprises a drum which rotates a housing. Sensors in the housing detect passage of an element on the drum, completing a circuit which actuates an exhaust valve solenoid or the injector needles.

21 Claims, 7 Drawing Sheets

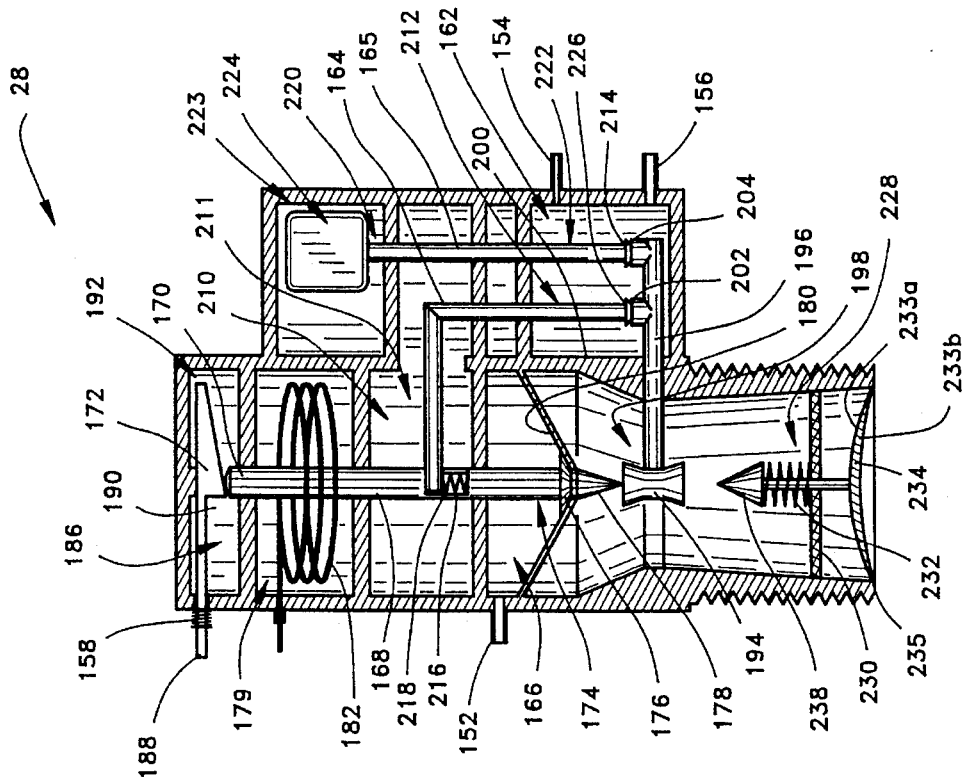
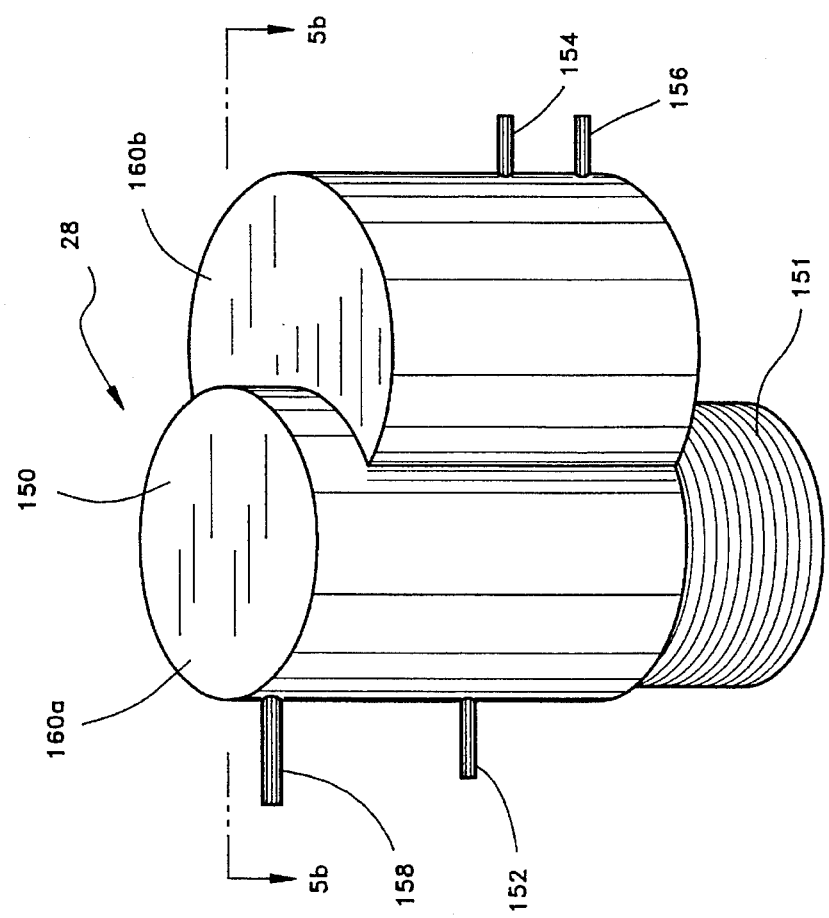
FIG. 5b
FIG. 5a

INTERNAL COMBUSTION ENGINE WITH IMPROVED EXHAUST VALVE, TIMING SYSTEM, AND INJECTOR

FIELD OF THE INVENTION

The present invention relates to an internal combustion engine. In particular, the present invention relates to an internal combustion engine having improved combustion chamber exhaust valve, improved air/fuel injector, and an improved timing system.

BACKGROUND OF THE INVENTION

The internal combustion engine is one of the most commonly found and used pieces of machinery on the planet. While the internal combustion engine has been in use for decades, there have been few substantial deviations from its original design.

Over the past 20 years, however, changes in the environment and the world economy have prompted a search for improvements in the internal combustion engine. First, the higher cost of gasoline through the depletion of oil reserves has resulted in a need for engines which are more fuel efficient in relation to their power output.

Second, stringent emission standards have been adopted by many countries and states. The need has arisen for engines which are cleaner burning and have reduced harmful emission outputs.

Many engines having greater fuel efficiency and lower emissions have been developed. These engines have suffered from numerous drawbacks, however. Most often, to accomplish the desired goals, the engine design becomes extremely complicated. This causes the initial cost of production to rise tremendously, and also raises later cost of repairs. In the competitive automobile industry, such increased costs must normally be born by the consumer. Unfortunately, when faced with these higher costs, consumers will normally choose the less environmentally sound, lesser cost alternative.

Further, current engine designs are based on the engine being constructed of metal. Metal is often costly to manufacture, and numerous harmful by-products are produced during manufacture. More importantly, however, metal is subject to wear, lessening the useful life of the engine.

Currently, other alternate materials are being examined for use in manufacturing engines. One such material is ceramic. Unfortunately, ceramic has not been proven useful in applications involving high impact stresses or forces, and is fairly weak when not formed into a bulky part.

Therefore, parts such as current design engine rockers and valves which are small and subject to repeated high impact forces are not suitable for manufacture of ceramic. A need exists for an engine design which is simple enough that the engine can meet the desired goals outlined above, and which can be manufactured from an alternate material such as ceramic.

SUMMARY OF THE INVENTION

In accordance with the present invention there is provided an improved internal combustion engine. In general, the engine includes at least one cylinder having a piston therein, and an intake passage and exhaust passage through a head located over said cylinder. The engine includes an improved exhaust valve and injector for each cylinder, and improved timing system for the injector and valve.

The exhaust valve comprises a cylindrical valve body, solenoid, and connecting linkage. The valve body is moveable from a first position in which a bore therethrough is aligned with the exhaust passage, to a second position in which the valve body obstructs the passage. Movement of the valve is effectuated by charging the solenoid, causing movement of the linkage and rotation of the valve body.

The injector comprises a housing having a first closed end and a second open end located in said intake passage. An air and a fuel reservoir are located in the housing. An elongate air needle located in the housing is selectively engageable with an orifice in the air reservoir. Movement of the needle is effectuated by a solenoid located at a second end thereof. Maximum travel of the needle is governed by a throttle control wedge located at the second end.

A venturi for mixing air and fuel is located below the orifice in the air reservoir. The venturi is located at the top of a mixing chamber having a bottom open end corresponding the second open end of the housing.

Fuel enters the venturi from a fuel line connected to the fuel reservoir. The fuel line has a first end located in the fuel reservoir. A first orifice is located in the first end of the fuel line. A primary fuel needle having a first end is selectively engageable with the orifice. A second end of the primary fuel needle is connected to the air needle, such that movement of the air needle effects movement of the primary fuel needle.

The fuel line includes a second orifice in its first end. A first end of a secondary fuel needle is selectively engageable with the second orifice. Movement of the second fuel needle is effectuated by an independent control motor located at a second end thereof.

Fuel passing through said first and/or second orifice into said fuel line mixes with air passing through the orifice in the air reservoir in the venturi. The resultant mixture then passes through the mixing chamber towards the second end of the housing. The mixture passes through a filtration screen and check valve before leaving the housing and entering the cylinder.

An improved timing mechanism is provided for operating each exhaust valve and injector. The timing mechanism comprises a housing having a rotatable drum therein. The housing carries a number of sensors, equal to the number of injectors and exhaust valves, on an inner surface. The sensors are spaced longitudinally along the preferably cylindrical housing.

Elements for tripping or actuating the sensors are spacedly located on the drum. One element is located on the drum in a location corresponding to each of said sensors.

The drum is rotated by a shaft connected thereto which extends through the housing. A pulley is located on the end of the shaft outside the housing. This pulley is turned by a belt connected to it and a pulley on an output shaft of the engine.

Each sensor is wired to its corresponding injector or exhaust valve, at the solenoid thereof. Movement of the element past the sensor acts to complete a circuit energizing the particular air needle actuating solenoid or exhaust valve actuating solenoid. For this reason, the elements are located circumferentially about the drum in locations which provide for accurate timing of these events with respect to one another.

Further objects, features, and advantages of the present invention will become apparent from the detailed description of the drawings which follows, when considered with the attached figures.

DESCRIPTION OF THE DRAWINGS

FIG. 5a is a perspective view of an air/fuel injector of the present invention; and FIG. 5b is a cross-sectional side view of the injector of FIG. 5a taken along line 5b–5b.

DETAILED DESCRIPTION OF THE PREFERRED EMBODIMENT

Figure 1:
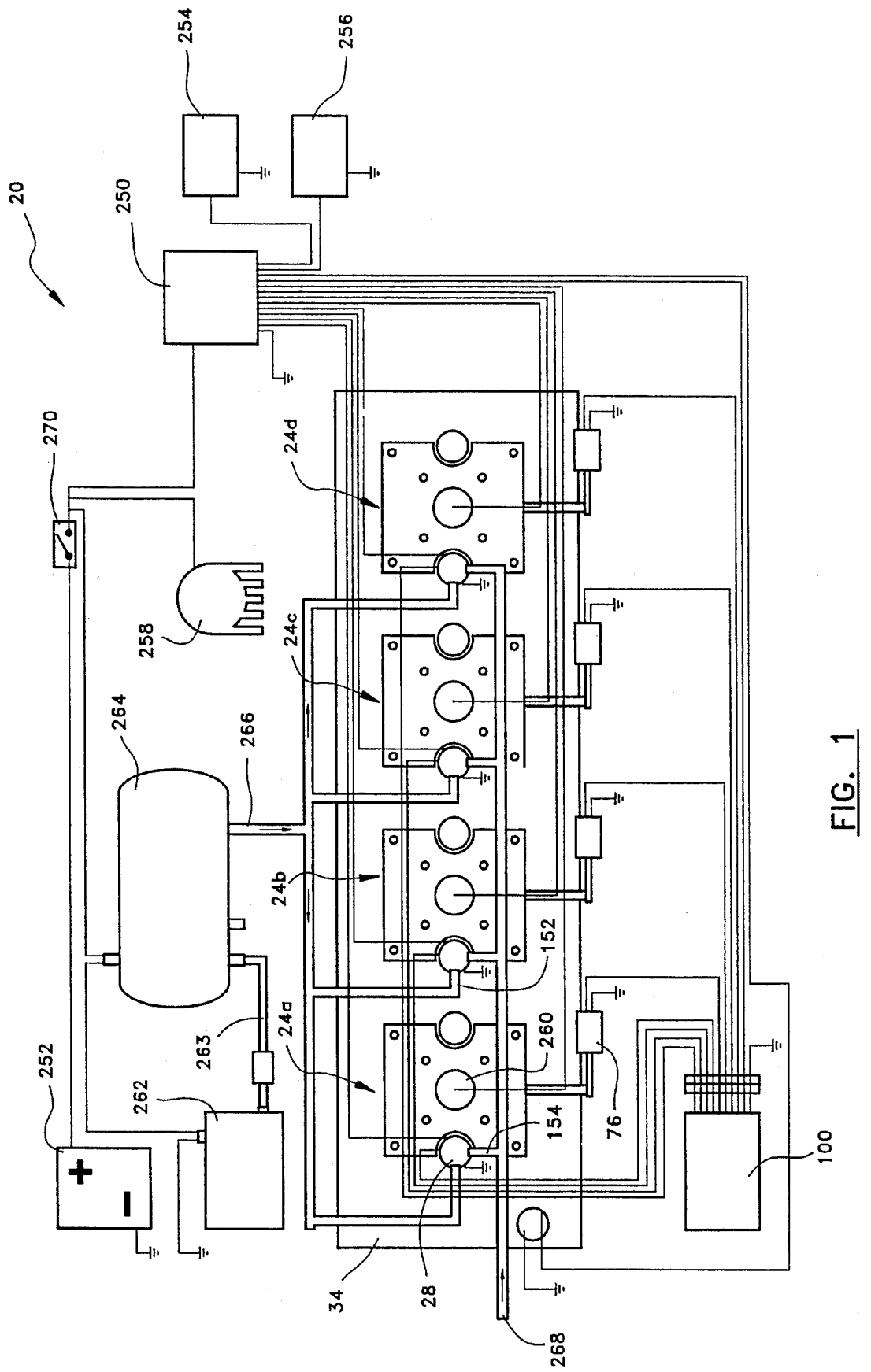
FIG. 1 is a schematic illustrating an internal combustion engine having four cylinders having an improved exhaust valve, and improved air/fuel injector, both operated by an improved timing system of the present invention.

FIG. 1 is a schematic of an internal combustion engine 20 in accordance with the present invention. The engine 20 of the present invention is similar to convention engines currently existing in that it works on the theory of burning fuel in a chamber to drive a piston connected to an output shaft. Thus, the engine 20 of the present invention preferably includes an engine block 22 (shown partially in FIG. 2) containing a number of cylinders 24a,b,c,d each having a piston 26 residing therein.

The engine 20 of the present invention is described herein as having for (4) cylinders 24a,b,c,d, although the engine 20 may have any number of cylinders from 1 to 16 or more, as known in the art.

Figure 2:
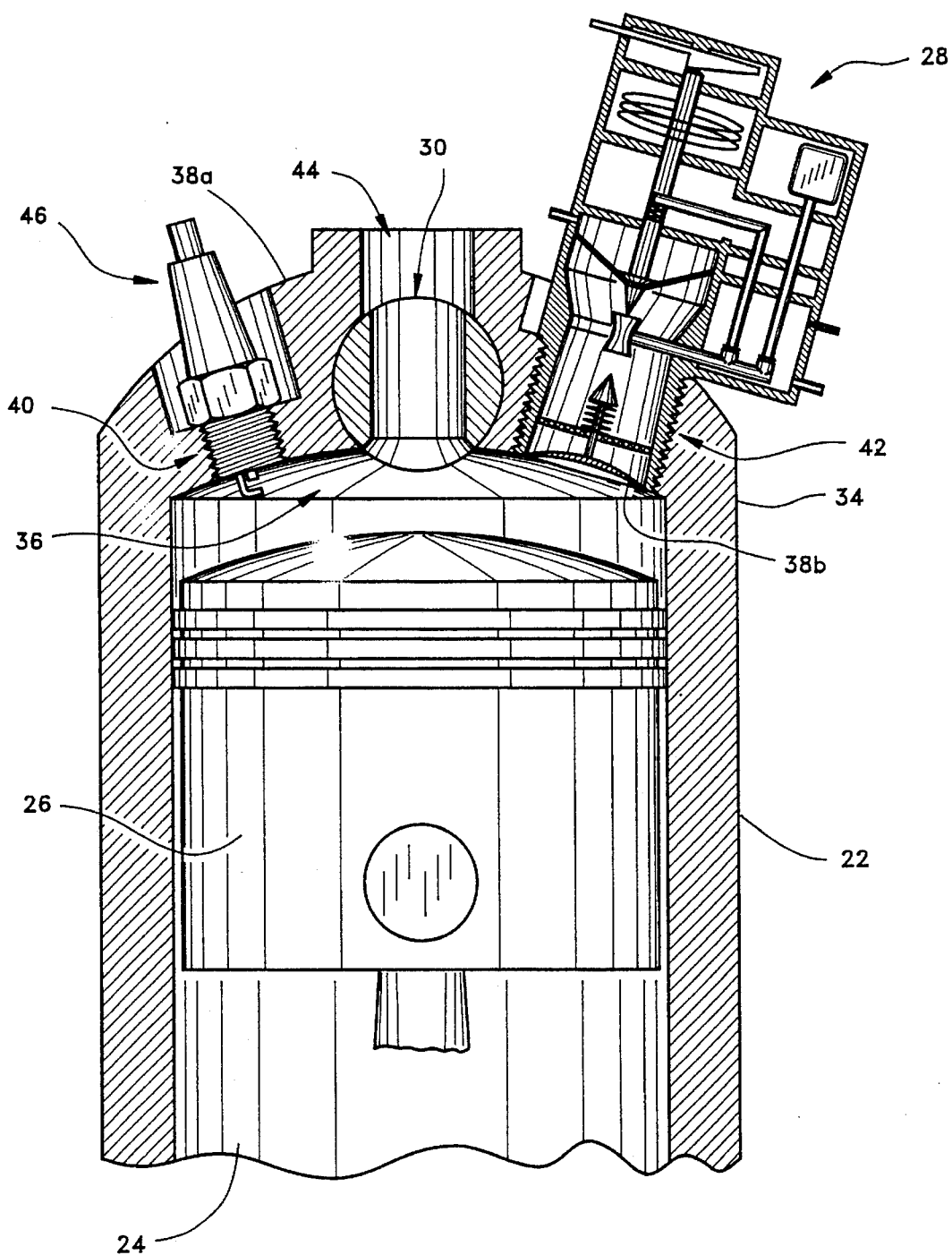
FIG. 2 is a cross-sectional view of a cylinder of an internal combustion engine including the improved exhaust valve and air/fuel injector of the present invention.

As illustrated in FIG. 2, a cylinder head 34 engages the top of the engine block 22. The head 34 includes a recess 36 (known in the art as the combustion chamber) in the area above each of the cylinders 24a,b,c,d, the cylinder and recess forming the combustion chamber for each piston 26. The recess 36 illustrated in FIG. 2 is hemispherical. The recess 36 may be wedge-shaped or be any number of other shapes as well known in the art. The head 34 is preferably attached to the block 22 in means known to those skilled in the art, such as with bolts.

Three passageways 40, 42, 44 lead from an outside surface 38a of the head 34 to the interior surface 38b of the head 34 at each recess 36. A conventional sparkplug 46 is located in threading engagement within the first passageway 40. An improved air/fuel injector 28, described in more detail below, is located in threading engagement with the second passageway 42. Lastly, an improved exhaust valve 30, also described in more detail below, is located in the third passageway 44. As illustrated in FIGS. 1 and 2, the three passageways 40,42,44 are preferably in axial alignment across each cylinder 24a,b,c,d. The passageways 40,42,44 may be oriented in any number of fashions, however.

An improved exhaust valve 30 and exhaust valve actuator 32 are illustrated in FIGS. 1, 2, and 3a–d. As described above, the third passageway 44 or exhaust port passes through the head 34 from each cylinder 24a,b,c,d. This passageway 44 may be of any number of sizes and shapes, but is most commonly circular and about 0.75 inches to 1.25 inches in diameter depending on engine displacement. Preferably, when the recess 36 has a hemispherical shape as illustrated in FIG. 2, the exhaust passageway 44 is located at the top of the "dome" of the recess. If the recess 36 has a different shape, it is preferred that the passage 44 be located in whatever area of the recess allows maximum exhaust gas movement out of the cylinder during the exhaust stroke of the piston. In such instance, it may be necessary to realign the first, second and third passageways 40,42,44 from the orientation described above.

Most importantly, the improved exhaust valve 30 is located in the exhaust port or passage 44 for controlling the passage of exhaust gases through it. In particular, a valve body 48 having a bore 50 therethrough is situated in the passage 44.

As illustrated in FIGS. 3a–d, the valve body 48 is preferably cylindrical in shape, having a length from a first end 52 to a second end 54 of about 1 to 1.5 inches, and a diameter of about 1 to about 2 inches, depending on engine displacement. A bevel 56 is located at each end 52,54 of the body 48. The bevel 56 is a sloping section of the body 48 connecting each end 52,54 to the outer side 58 thereof. The bevel 56 is about 0.1–0.3 inches long and about 0.1–0.3 inches deep.

Figure 3A:
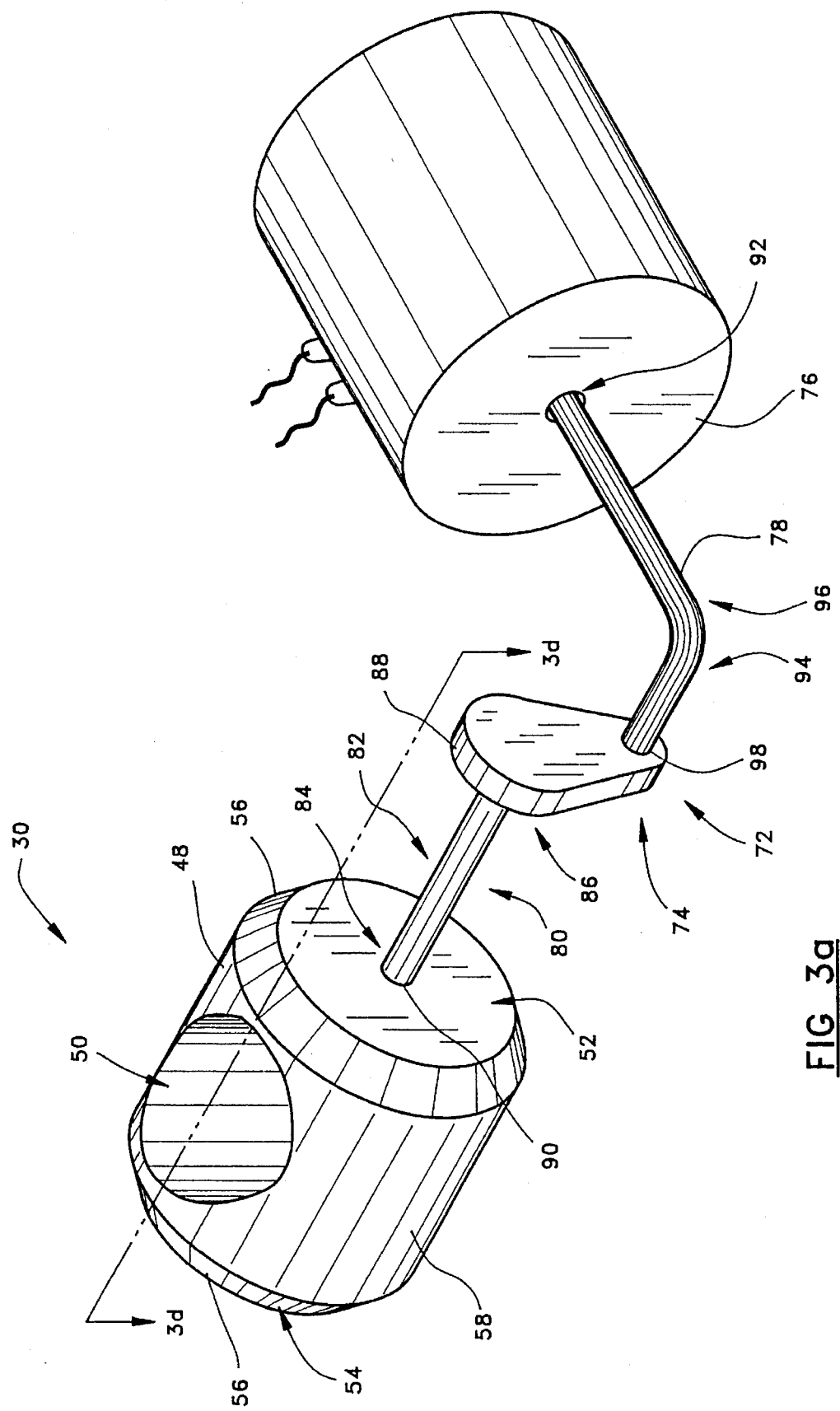
FIG. 3a is a perspective view of an exhaust valve of the present invention, including an actuator arm and actuating solenoid.
Figure 3B:
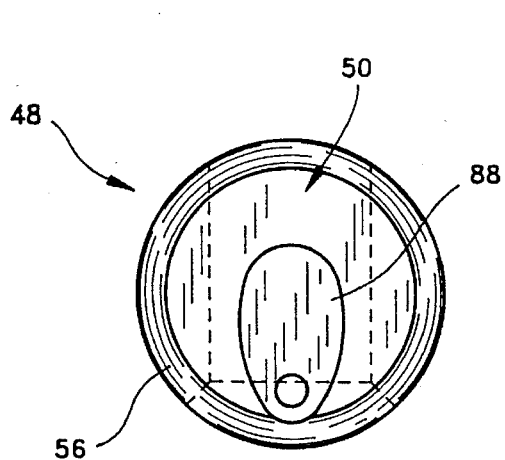
FIG. 3b is a front view of the exhaust valve of FIG. 3a illustrated in the same position as it is illustrated in FIG. 2, wherein an exhaust passageway through the valve is lined up with said cylinder and exhaust pipe.
Figure 3C:
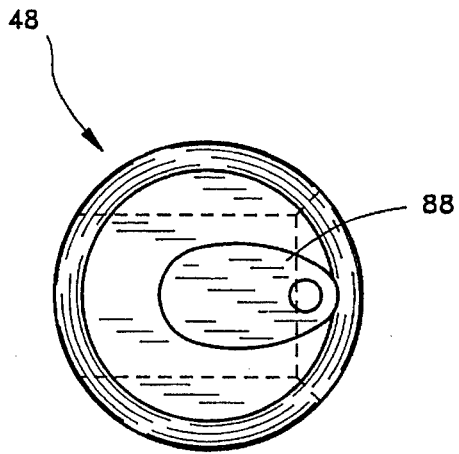
FIG. 3c is a front view of the exhaust valve of FIG. 3a illustrated in a position in which an exhaust passageway therethrough is not lined up for allowing exhaust gasses to pass from a cylinder to an exhaust pipe.
Figure 3D:
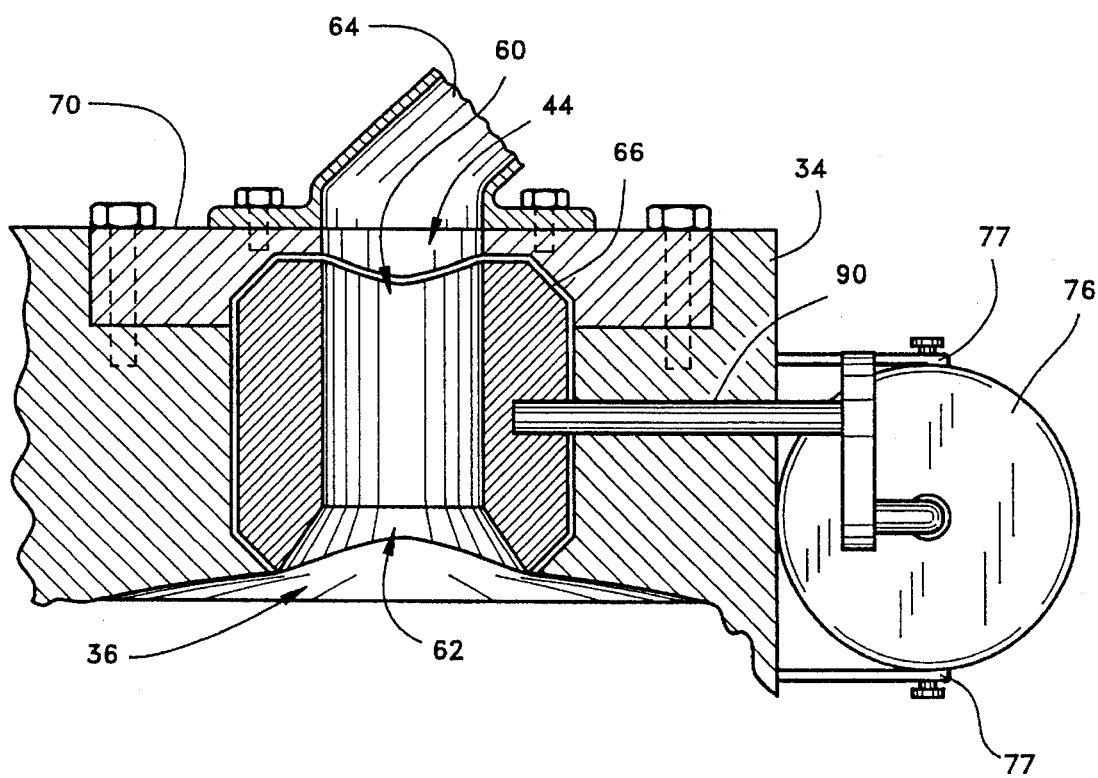
FIG. 3d is a cross-sectional side view of the exhaust valve of FIG. 3a taken along line 3a–3d.

As illustrated in FIG. 3d, the bore 50 in the valve body 48 preferably includes a first section 60 for alignment with the exhaust passage 44. This section 60 of the bore 50 has approximately the same diameter as the exhaust passage 44. The bore 50 also includes a second section 62 for alignment with the recess 36 and cylinder 24a,b,c,d. The second section 62 is the same size as the first section 60 where it meets the first section, and widens to form an opening in the body 48 which matches the slope and shape of the interior surface 38b of the head 34 at the recess 36 therein.

FIGS. 3b and 3c illustrate the two primary positions of the valve 30 in the passageway 44. First, as illustrated in FIG. 3c, the valve body 48 is positioned such that the bore 50 therethrough is out of alignment by ninety (90) degrees from the exhaust passage 44. Second, as illustrated in FIGS. 3b, 3d and FIG. 2, the bore 50 of the valve body 48 is aligned with the exhaust passage 44 and recess 36, forming a pathway for exhaust gasses to pass from the cylinder 24a, b,c,d to an exhaust pipe 64 connected to the exterior surface 38a head 34.

The valve body 48 is located within a substantially cylindrical chamber 66 in the head 34, as illustrated in FIG. 3d. The chamber 66 includes an inner surface 68 which mirrors the outer shape of the valve body 48. By reducing the space between the inner surface 68 of the chamber 66 and the outer surface of the body 48, the amount of exhaust gases leaking from the cylinder 24a,b,c,d to the exhaust pipe 64 is reduced when the bore 50 in the valve body 48 is not aligned with the exhaust passage 44. In order that the valve body 48 may be positioned in the chamber 66, the head 34 preferably includes an insert 70. The insert 70 is a portion of the head 34 surrounding the passage 44 which can be removed for valve body 48 installation. The insert 70 illustrated is a rectangular block of head material surrounding the passageway 44, which is bolted to the head 34.

The valve 30 includes means 72 for moving the valve body 48 between the first and second positions. Preferably, the means 72 comprises a solenoid 76 which actuates a connecting linkage 74 connected to the valve body 48. The linkage 74 illustrated comprises an actuating rod 78 connected to the solenoid 76, and an arm 80 connected to the body 48 of the valve 30. The arm 80 includes an elongate section 82 having a first end 84 connected to the body 48 of the valve 30 and a second end 86 having a connecting member 88 located thereon.

The arm 80 preferably passes through a small bore 90 in the head 34 as illustrated in FIG. 3d. The connecting member 88 is a substantially flat, somewhat elongate member connected to the arm 80 at one end and the actuating rod 78 at the other. The member 88 may have any number of shapes, as long as the member 88 provides the desired function of converting the linear motion of the rod 78 into rotational movement of the body 48 of the valve 30.

The solenoid 76 is of a type known to those skilled in the art, and is preferably electrically powered. Alternating charges preferably cause the solenoid's actuating rod 78 to move in and out. As illustrated, the solenoid 76 is connected to the outside of the head 34/block 22 with a bracket 77 or similar support structure.

The rod 78 has a first end 92 located in the solenoid 76 and actuated thereby, and a second end 94 with a bend 96 for engaging the connecting member 88. The bend 96 in the rod 78 is preferably ninety (90) degrees, so that the rod 78 engages the side of the connecting member 88 through a hole 98 therein, as illustrated in FIG. 3a. Of course, the rod 78 could be of a variety of other shapes and engage the connecting member 88 or arm 80 in a number of fashions.

Most importantly, each cylinder 24a,b,c,d includes a separately actuated exhaust valve 30 as described above. As well known, in multi-cylinder engines, each piston fires, and thus moves through the exhaust stroke, at different times from the pistons in the other cylinder(s). In accordance with the present invention, a system for timing the opening of the exhaust valve 30 during the exhaust stroke of each piston 26 is provided.

In particular, unlike prior art engines, the exhaust valves 30 of the present invention are independently actuatable. Because each valve 30 includes its own solenoid 76, each valve body 48 can be manipulated independently of the others. Further, the valves 30 can each be actuated at the optimum time to facilitate maximum exhaust gas discharge from the cylinder. While individual operation of each valve 30 can be accomplished be numerous means, the preferred mechanism is the timing mechanism 100 described below.

Figure 4A:
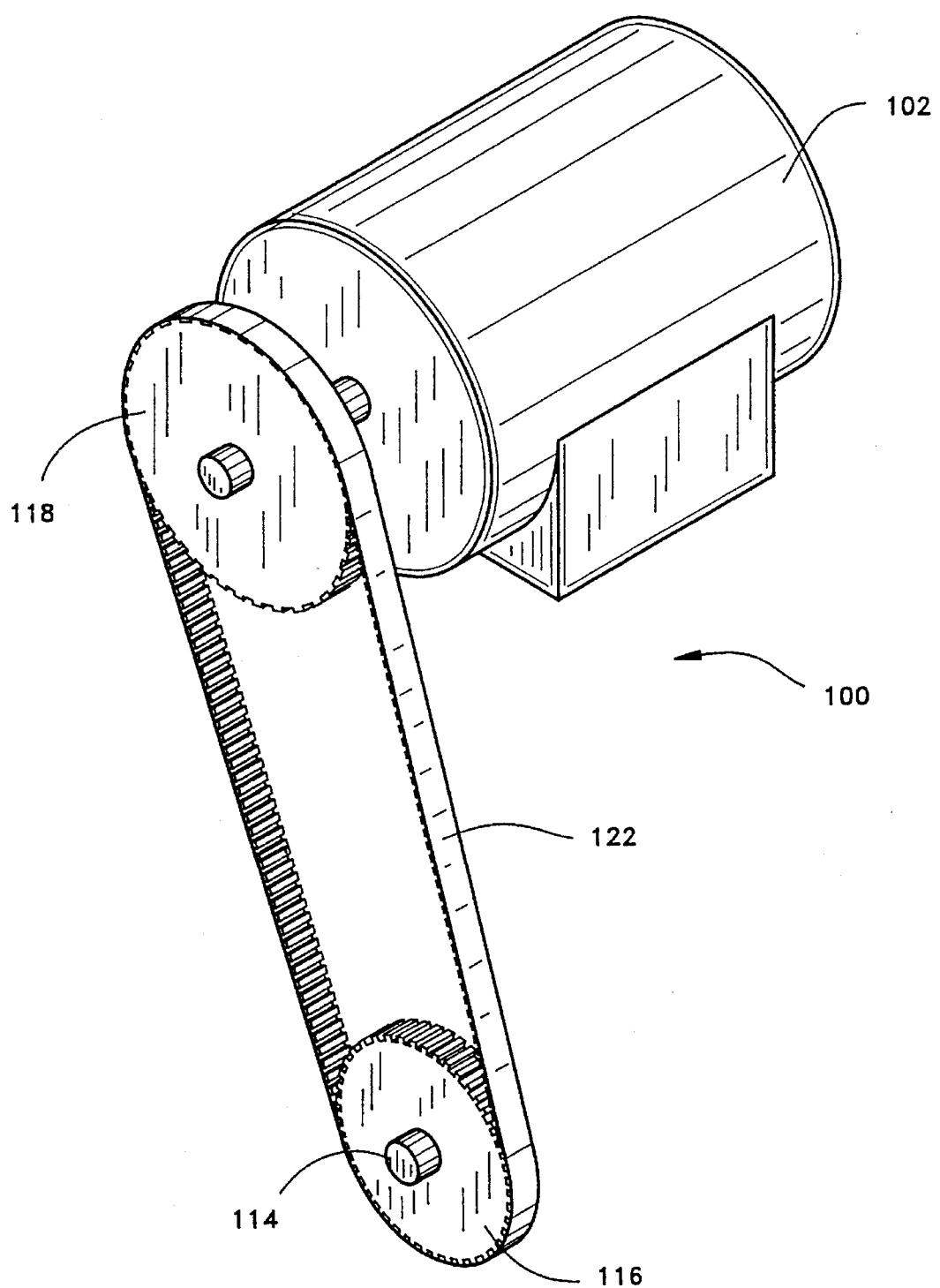
FIG. 4a is a perspective view of a valve timing mechanism of the present invention driven a belt connected to a pulley driven by an engine output shaft.
Figure 4B:
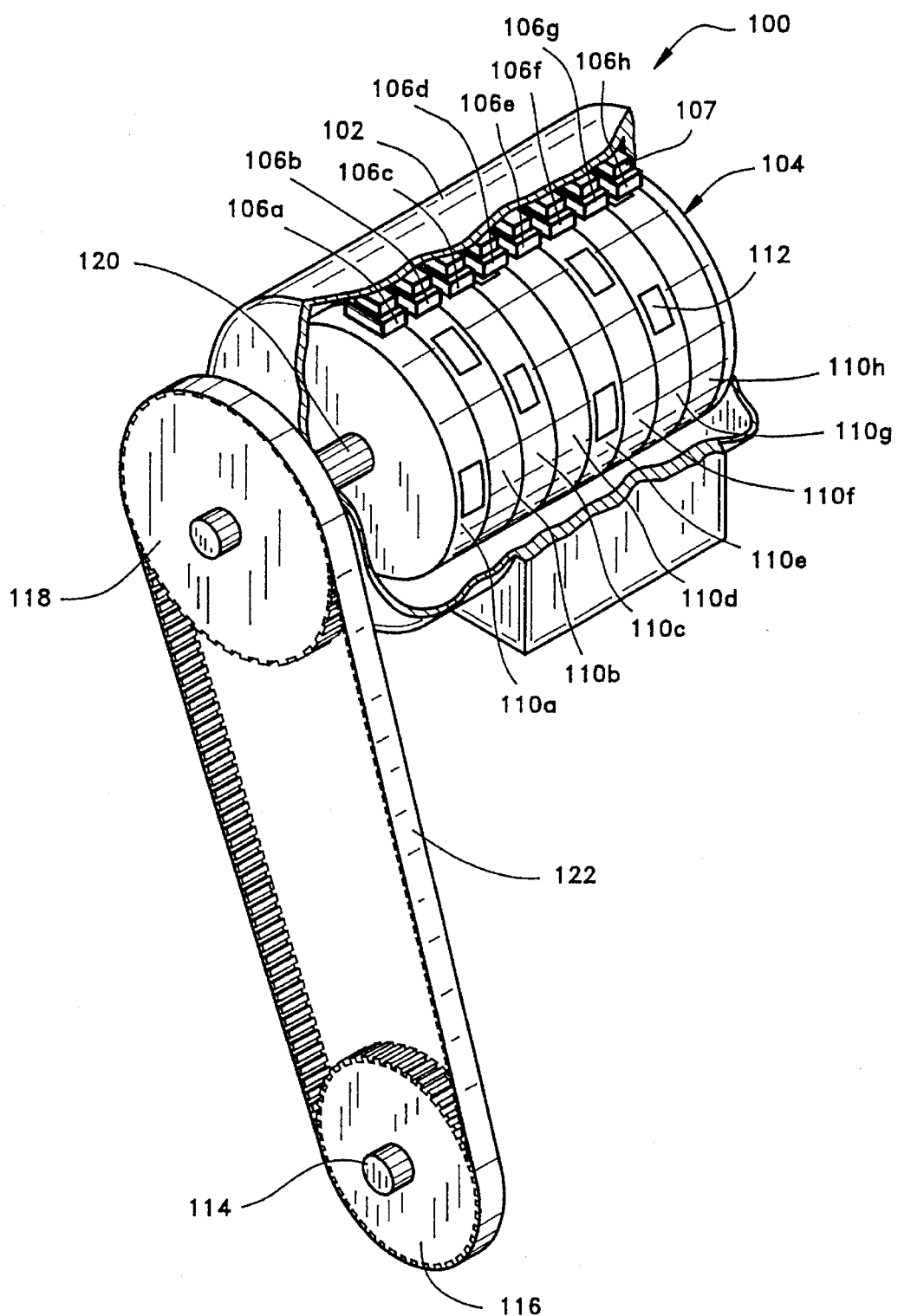
FIG. 4b is a partial cut-away view of the valve timing mechanism of FIG. 4a illustrating an outer housing having a number of sensors thereon, and an inner drum.

FIGS. 4a and 4b illustrate an exhaust valve 30 and fuel injector 28 timing mechanism 100. As illustrated in FIG. 1, the timing mechanism 100 controls the exhaust valve 30 at each cylinder 24a,b,c,d.

The timing mechanism 100 generally comprises a housing 102 having a rotatable drum 104 therein. The housing 102 is generally cylindrical and hollow, having a number of sensors 106a–h located on an inner surface 108 thereof.

The housing 102 is preferably about 6–8 inches long, and 4–5 inches in diameter. The housing 102 can be made of any number of materials, but is preferably made of steel to be durable and wear resistant.

Each sensor 106a–h is about 0.080–0.175 inches thick, 0.25–0.35 inches wide, and 0.5–0.75 inches in length. Each sensor 106a–h is preferably made of metal and mounted on a short, flexible arm 107, and has an outer surface which is slightly concave. The drum 104 is also preferably cylindrical in shape, having an outer diameter slightly smaller than the inner diameter of the housing 102, compensating for the thickness of the sensors 106a–h, and having a length slightly less than the length of the housing 102. The drum 104 may be made of any of a number of materials, such as plastic or metal, although plastic is preferred.

The drum 104 is divided into a number of equal sized segments 110a–h equal to the total number of cylinders in the engine multiplied by two. In the instance case, there are eight segments 110a–h corresponding to the four cylinders 24a,b,c,d. These segments 110a–h represent "slices" of the drum 104 in the form of circumferential portions of the drum 104 which rotate under respective sensors 106a–h. The sensors 106a–h are thus spread out along the length of the housing 102.

Actuating or sensor tripping means, preferably in the form of elements 112, such as magnets, are embedded within, or located on, the outer surface of the drum 104 in each segment 110a–h. The elements 112 are preferably about 0.175 inches thick, 0.5–4 inches long, and about 0.25 inches wide, the width of the element 112 being limited to the width of the segment 106a–h within which it is located. The length of the element 112 is chosen to trigger a particular sensor 106a–h, as described below, to trigger a particular event for a given period of time. Because the drum 104 is cylindrical in shape, the elements 112 preferably have an outer surface which is convex in shape, allowing them to pass very close to the concave shaped sensors 110a–h.

The elements 112 in the segments 110a–h of the drum 104 are circumferentially about the drum 104. In particular, the element 112 in each segment 110a–h is located in a position on the drum 104 which corresponds to the particular event it must trigger in relation to the other element 112.

For example, in the engine 20 described, the sensors 106a–h trigger the injection of air/fuel, and the opening of the exhaust valve at each of the four cylinders 24,b,c,d.

As described in more detail below, each sensor 106a–h is hardwired to the injector 28 and valve 30 located at each cylinder 24a,b,c,d. Half of the sensors, four in this case, control the injectors 28 in the engine 20 described, while the other sensors 106a–h control the exhaust valve 30 solenoids 76.

Thus, the element 112 in the first segment 110a is located in a position circumferentially about the drum 104 to trigger the injector for the first cylinder 24a. The element 112 in the second segment 110b is located in a position on the drum 104 to open the exhaust valve of the first cylinder 24a. Because the exhaust valve is opened after the injector, the element 112 in the second section is located in a different circumferential position in segment 110b than the element 112 in the first segment 110a. The exact locations with respect to each other depends on the diameter of the drum 104 and the desired timing of these events.

Of course, the remaining elements 112 in the remaining segments 110c–h are located on the drum 104 in positions with respect to one another, and the elements 112 in segments 110a,b to trigger the valves and injectors at the other cylinders 24b,c,d at the appropriate times.

The drum 104 is rotated within the housing 102. Preferably, the drum 104 is rotated at the same speed as a crank shaft 114 of the engine 20 to which the pistons 26 are connected. A first toothed pulley 116 is located on the crankshaft 114, and a second toothed pulley 118 is located on a shaft 120 which passes through the housing 102 and is connected to the drum 104. Each of the pulleys 116,118 is preferably the same size and connected by a belt 122. The belt 122 includes a number of teeth on an inner surface for engagement with the outwardly extending teeth on the pulleys 116,118. The engagement of the teeth on the pulleys 116,118 and belt 122, along with the fact that the pulleys are of the same size, ensures that the drum 104 is driven at the same speed as the engine crankshaft 114.

Because the timing mechanism 100 is driven by the crankshaft 114 of the engine 20, it is preferably located near the engine. In particular, it is best if the timing mechanism 100 is bolted directly to the engine or a surrounding support structure, in a position in which the pulleys 116, 118 lie in the same place.

In accordance with a further aspect of the engine 20 of the present invention, there is provided an improved air/fuel injector 28. The injector 28 is located in the second passageway 22 or "intake" passage in the head 34 which leads into the cylinder 24a,b,c,d.

As illustrated in FIGS. 2, 5a, and 5b, the injector 28 comprises an outer housing 150 having a distal and proximal end, and which has the shape of two interlocking cylinders 160a,b. As used herein, the by "proximal" it is meant the portion of the injector which, when installed, is furthest from the head 34, while by "distal" it is meant the portion of the injector closest the head. The distal end is threaded 151 for engagement with threads on the head 34 in the second passageway 42.

An air inlet tube 152, fuel inlet tube 154, excess fuel outlet tube 156, and cable control access tube 158 are provided through the housing 150 and protrude therefrom.

As illustrated in FIG. 5b, a fuel reservoir 162 and primary and secondary fuel needles 164,165 are located in one of the cylinders 160b. An air reservoir 166 and air needle 168 are located in the other cylinder 160a.

The air needle 168 is an elongate pin having a first free end 170 for engagement with a wedge 172, and a second end 174 having an outwardly extending flange 176 for closing an orifice or passageway 178. The needle 168 is about 2–3 inches long and 0.25 inches in diameter. The flange 176 is preferably tapered to seat against the edge of the bottom surface 180 at the orifice 178.

The air reservoir 166 is a cylindrical chamber located in the housing 150 adjacent the air inlet tube 152. A cone-shaped bottom surface 180 of the reservoir 166 slopes downwardly to the orifice 178, which is preferably a substantially circular passage through the bottom surface. The diameter of the orifice 178 is about 0.25–0.35 inches.

In a first position, the flange 176 which is located at the second end 174 of the air needle 168 seats against the bottom surface 180 of the air reservoir 166, sealing the orifice 178. Preferably, a small section of the air needle 168 actually protrudes through the orifice 178 to improve the seal therebetween. In a second position, the flange 176 of the air needle 168 is lifted above the bottom surface 180 of the air reservoir 166, allowing air to pass from the reservoir through the orifice 178.

Means 179 for moving the air needle 168 from the first position to the second position are provided. Preferably, the means 179 comprises a solenoid 182. The solenoid 182 is preferably located about the air needle 168 near the first end 170 thereof in a portion of the housing 150 above the air reservoir 166. In order that the needle 168 move in response to charging of the coils of the solenoid 182, the needle is preferably made of metal, with the coils of the solenoid circling the needle.

The maximum movement or "throw" of the needle 164 by the solenoid 182 is controlled by a wedge block 172. The wedge block 172 is located adjacent the first end 170 of the air needle 168 at the proximal end of the housing 150. The block 172 travels back and forth in a slot 186 in the housing 150 as controlled by a cable 188. The block 172 has a smooth bottom surface, and preferably tapers in thickness from a first end 190 to second end 192. The cable 188 is connected at one end to an accelerator control or pedal (not shown), passes through the cable control tube 156, and is connected to the second or thick end of the block 172.

Air which passes through the orifice 178 when the air needle 168 is lifted up passes through a venturi 194 where it is mixed with fuel. The venturi 194 is preferably located at the end of a fuel line 196 and centered, just below the orifice 178. The distance between the orifice 178 and venturi 194 is about 0.25–0.5 inches. The venturi 194 is centered in an elongate hollow mixing chamber 198 within the housing 150. This chamber 198 has a first closed end formed by the bottom surface 180 of the air reservoir 166, and a second end which is open at the distal end of the injector 28. This chamber 198 is about 0.75–1.25 inches in diameter, and about 0.75–1.25 inches long.

The venturi 194 is hollow and hour-glassed shaped, having a wide entry and exit, and narrow central section, as well known in the art. The venturi 194 has an inner diameter of about 0.25–0.35 inches, and a length of about 0.25–0.35 inches.

The fuel line or conduit 196 is connected to the venturi 194 in the side thereof, and extends from the venturi back into the second portion 160b of the housing 150. In particular, the fuel line 196 extends from within the fuel reservoir 162 to the venturi 194 which is separated from the fuel reservoir by a wall 200.

First and second fuel inlet orifices or passages 202,204 are located at the end of the fuel line 196 located in the fuel reservoir 162. Each orifice 202,204 comprises a hole in the tube of about 0.010–0.040 inches in diameter.

The fuel reservoir 162 is a chamber located in the second portion 160b of the housing 150. Fuel is directed into the reservoir 162 from a fuel supply source (not shown) through the fuel inlet tube 154. Fuel which is not used or which must be drained from the reservoir 162 is removed from the reservoir through the fuel outlet tube 156.

As can be seen, the primary and secondary fuel needles 164,165 control the flow of fuel from the reservoir through the orifices 202,204 into the fuel line 196 to the venturi 194. The primary fuel needle 164 is an elongate, bent pin having a first end 210 connected to the air needle 168, and a second end 212 having an outwardly extending tapered flange 214 thereon for engagement with the fuel line 196 at the orifice 202 therein.

Means 211 for moving the primary fuel needle 164 are included. In particular, the first end 210 of the primary fuel needle 164 which is located at the end of a portion of the needle which extends at a 90 degree angle from the remainder of the needle, rides in a slot 216 in the air needle 168. The slot 216 is about 0.080–1 inches long, and just wide enough to accept the end of the primary fuel needle 164. The means 211 thus comprises the same means 179 as moves the air needle 168, through the interconnection of the two needles.

A spring 218 located in the slot 216 biases the first end 210 of the primary fuel needle 164 upwardly in the slot. This spring 218 preferably has a spring force of about 5 lbs/inch.

The primary fuel needle 164 is moveable between first and second positions. In the first position, the flange 226 engages the fuel line 196 at the first orifice 202 so as to obstruct it and prevent fuel in the reservoir 162 from passing therethrough. In a second position, the needle 164 is raised upwardly such that the flange 226 does not obstruct the orifice.

The second fuel needle 165 is also an elongate pin which includes a first end 220, second end 222. The first end 220 of the second needle 165 preferably engages a mixture control motor 224 located in the housing 150. An outwardly extending, tapered flange 226 is located at the second end 222 of the needle 165.

Like the first fuel needle 164, the second fuel needle 165 is movable between first and second positions. In the first position, the flange 226 engages the fuel line 196 at the orifice 204 therein preventing fuel from flowing from the reservoir 162 into the line. In a second position, the needle 165, including the flange 214, is raised upwardly, opening the orifice 204.

Means 223 for moving the second fuel needle 165 are also provided. The means 223 preferably comprises the mixture control motor 224. This motor 224 may either raise and lower the needle 165 using a solenoid effect, or via direct mechanical connection.

Air which passes through the orifice 178 mixes with fuel from line 196 in the venturi 194. This mixture then passes downwardly in the mixing chamber 198. A check valve 228 and filtration screen 230 are located in the lower portion of the chamber 198, adjacent the distal end of the housing 150.

The filtration screen 230 is a fairly rigid member having a mesh structure for allowing substantially all of the air/fuel mixture to pass through it, but which stops large particulate matter. The screen 230 is preferably made of metal, and has a mesh which filters particulate in the range of 300–400 microns. The screen 230 is attached to the inside wall of the housing 150, just above the distal end of it.

The check valve 228 comprises a spring 232, valve body 234, and stem 236. The valve body 234 is a rigid piece of metal, having a top surface 233a, bottom surface 233b, and outer edge 235. The body 234 has a diameter nearly equal to that of the chamber 198 in the housing 150, such that the outer edge 235 thereof abuts the inside surface of the housing 150 at the chamber 198. The valve body 234 is concave in shape, and located at the distal end of the housing 150. When the injector 28 is installed, the bottom surface 233b of the valve body 234 acts as a portion of the inside surface of the recess 36, as illustrated in FIG. 2.

The stem 236 extends upwardly from the top surface 233a valve body 234, through the screen 230 to a cone 238. The cone 238 is a conical member located at the free end of the stem 236, having its narrow pointed end facing the proximal end of the injector 28, and its wide end facing the distal end of the injector. The cone 238 is preferably about 0.060–0.080 inches tall, and has a maximum outer diameter of about 0.175 inches.

The valve body 234 is movable from first to second positions. The body 234 is biased towards a first position by the spring 232. The spring 232 is located around the stem 236 between the screen 230 and the cone 238, pressing the cone, and thus the valve body 234, upwardly. In this fashion, the valve body 234 is biased into the position shown in FIG. 5b, in which the valve body obstructs the chamber 198 at the distal end of the injector, preventing the passage of air/fuel through the injector into the cylinder 24a,b,c,d. The valve body 234 is movable to a second, open position, however. In particular, when pressurized air/fuel mixture passes through the venturi 194 and encounters the cone 238 and top surface 233a of the valve body 234, the valve body 234 is pressed downwardly against the spring 232. This force presses body 234 out of the injector housing 150, opening a passageway between the inside of the housing at chamber 198 to the inside of the cylinder 24a,b,c,d.

FIG. 1 is a schematic view of the engine 20 of the present invention illustrating the interconnection of the timing mechanism 100, injectors 28, and valves 30. As illustrated, the entire engine 20 is controlled by an central computer 250, well known in the art. This computer is powered by a battery 252, and is connected to a road speed sensor 254, throttle position sensor 256, a distributor 258, and oxygen sensors 260, all of which are known in the art, as well as the timing mechanism 100 of the present invention.

As illustrated, air for injection into the cylinders 24a,b,c,d by the injectors 28 is supplied by a compressor 262 which preferably compresses air to 30–60 PSI. The compressed air is routed from the compressor 262 via an air line 263 to an air storage tank 264. This tank 264 stores the pressurized air in sufficient quantity that outgoing air through air lines 266 leading to the cylinders 24a,b,c,d has a nearly constant pressure.

The air lines 266 connect the air tank 264 with the air inlet tube 152 located on each injector 28 at each cylinder 24a,b,c,d. The air lines 266 are preferably made of metal, such as aluminum or the like, to withstand the fairly high pressure air within them.

A fuel line 268 from a fuel tank (not shown) supplies fuel to each of the fuel inlets 154 on each of the injectors 28 at each cylinder 24a,b,c,d. A return fuel line (not shown) connects the fuel tank with the fuel outlet 156 on each injector 28.

The timing mechanism 100 is connected to both the solenoid 182 of each injector 28, plus each valve actuating solenoid 76. In particular, the timing mechanism 100 is hardwired to and supplies the power necessary to operate the solenoid 182 within each injector 28 which moves the air needle 168. Further, the mechanism 100 is hardwired to each solenoid 76 which effects movement of the linkage 74 which moves each exhaust valve 30. By the term "hardwired" it is meant that a wire or other electrically conductive material is connected to the mechanism 100 and the solenoid.

Use of the engine 20 of the present invention will now be described in conjunction with the Figures. The engine 20 is started in the typical fashion by turning an ignition switch 270, which provides power to a starter motor (not shown). Operation of the engine 20 is then as follows.

Air and fuel are supplied to each cylinder 24a,b,c,d on the intake stroke of each piston 26 through the injector 28. Air from an outside source is initially captured and compressed by the air compressor 262, and fed into the air storage tank 264 through the air line 263. Pressurized air in the tank 264 passes through air lines 266 to each injector 28, and into the air reservoir 166 in each injector through the air inlet tube 152.

Fuel is supplied to each injector 28 through the main fuel line 268. Fuel passes into the fuel reservoir 162 in each injector 28 through the fuel inlet 154.

When the engine 20 in running (or being started), the crankshaft 114 turns, thus turning the drum 104 of the timing mechanism 100. As the drum 104 turns, the elements 112 in each segment 110a–h pass by the corresponding sensors 106a–h. As the "injector-actuating" elements 112 pass by their respective sensors 106a–h, an electrical circuit at the sensor 106*a–h* is completed, and the solenoid 182 in the corresponding injector 28 is energized.

When the solenoid 182 is energized, the air needle 168 in that injector 68 is lifted upwardly. The ultimate height which the air needle 168 achieves is determined by the throttle control, in the form of the wedge 172 operated by the cable 188. The further out the wedge 172 is pulled, the higher the needle 168 is allowed to travel. The higher the needle 168 moves, the more air (and fuel) is allowed to pass into the cylinder 24*a,b,c,d.*

When the air needle 168 moves upwardly, the flange 176 thereon moves out of the orifice 178 in the air reservoir 166, allowing air to move through the orifice 178. At the same time, the primary fuel needle 164, which is connected to the air needle 168, is forced upwardly. This causes the flange 226 on the fuel needle 164 to move out of orifice 202, allowing fuel in the fuel reservoir 162 to pass into the fuel line 196.

The air passing through the orifice 178 draws the fuel in the fuel line 196 into the venturi 194, where the air and fuel are swirled together and mixed. This mixture then impinges on the cone 238, and after passing through the screen 230, the top surface 233*a* of the valve body 234. Pressure on the cone 238 and valve body 234 presses the valve body 234 outwardly of the injector 28 into the cylinder 24*a,b,c,d,* opening a passage from the chamber 198 into the cylinder. This allows the air/fuel mixture to pass into the cylinder 24*a,b,c,d* to charge it.

Once the element 112 on the drum 104 passes by the corresponding injector sensor 106*a–h,* the circuit is closed and the solenoid 182 is deactivated, causing the air needle 168 to reseat itself, closing orifice 178. Because of the spring bias on the fuel needle 164, the fuel needle both opens last, and closes first, with respect to the air needle 168 to which it is connected.

As described above, the injector 28 includes a secondary fuel needle 165. This needle 165 is operated by a motor control 224 which is connected to the computer 250. In particular, if the computer 250 senses that the mixture in the cylinder 24*a,b,c,d* (via the oxygen sensor 260) is lean, or under starting conditions where it is necessary to increase the fuel content, the secondary fuel needle 165 is opened. The computer 250 sends an electric signal to the motor 224, which lifts the needle 165 upwardly. This causes the flange 226 thereon to move out of orifice 204, allowing additional fuel to pass from the reservoir 162 into the fuel line 196. The operation of the second fuel needle 165 is timed with the operation of the primary fuel needle 164 via a link between the computer 250 and the timing mechanism 100.

Once the charge of air and fuel is in the cylinder 24*a,b,c,d,* the charge is compressed and then detonated with the spark plug 46, and then the exhaust gases are pressed out of the cylinder through the exhaust passage 44. As the crankshaft 114 turns, the elements 112 corresponding to the exhaust valve actuation sensors 106*a–h* pass those sensors, completing a circuit which energizes the exhaust valve actuating solenoids 76 at each cylinder 24*a,b,c,d.*

When the solenoid 76 is activated, it pulls the rod 78 inwardly, thus pulling the connecting member 88, which in turns rotates the arm 80. Rotation of the arm 80 turns the valve body 48 into a position where an open passage is formed from the cylinder 24*a,b,c,d* through the bore 50 in the body 48, to the exhaust pipe 64. This permits the exhaust gases to be exhausted from the system.

Once the element 112 which completed the circuit for the opening of the solenoid 76 passes past the sensor 106*a–h,* the circuit is deactivated, and rod 78 is biased outwardly back to its steady state position. This movement causes a rotation of the valve body 48 back to the closed position where the body 48 of the valve obstructs the passage 44 through the head 24.

It will be understood that the above described arrangements of apparatus and the methods therefrom are merely illustrative of applications of the principles of this invention and many other embodiments and modifications may be made without departing from the spirit and scope of the invention as defined in the claims.

I claim:

1. An internal combustion engine including an engine block with at least one cylinder therein and a piston in each cylinder, a head connected to the engine block and located above each cylinder, the head including an intake passage and exhaust passage therethrough into each cylinder comprising:

an exhaust valve, said valve including a rotatable body located in said exhaust passage, said body including a bore therethrough and an arm extending outwardly therefrom for actuation by a solenoid, said body moveable from a first position in which said bore is aligned with said exhaust passageway to a second position in which said body obstructs said passageway;

an air/fuel injector for location in said intake passageway in said head, said injector comprising an outer housing having an air reservoir and fuel reservoir therein, an air needle for selective closure of a passageway from said air reservoir to a mixing chamber, and a fuel needle for selective closure of a fuel conduit extending from said fuel reservoir to said mixing chamber, a venturi for mixing air and fuel, said venturi located in said mixing chamber, said chamber having a first closed end and a second open end, and a check valve located at said second end; and a timing mechanism for controlling the movement of the exhaust valve and the air and fuel needles in said injector, said timing mechanism comprising an outer housing having a rotatable drum therein, a plurality of sensors located on said housing and a plurality of elements on said drum corresponding to said sensors, said drum rotatably connected to an output shaft of said engine.

2. The engine of claim 1, wherein said exhaust valve body is cylindrical in shape, has first and second bevelled ends, and is located in a similarly shaped chamber located in said head.

3. The engine of claim 1, wherein said arm on said valve body is connected to an actuating rod connected to said solenoid.

4. The engine of claim 1, wherein said injector includes a second fuel needle for selective closure of said fuel conduit as well.

5. The engine of claim 4, wherein said second fuel needle is actuated by a motor control unit.

6. The engine of claim 1, wherein said air needle includes a first end and means located at said first end for selectively moving said needle.

7. The engine of claim 1, wherein a first end of said air needle engages a wedge block.

8. The engine of claim 1, wherein a first end of said fuel needle engages said air needle.

9. The engine of claim 8, wherein said first end of said fuel needle rides in a slot in said air needle, said slot containing a spring for biasing said first end of said fuel needle upwardly in said slot.

10. The engine of claim 1, wherein said injector includes an air inlet passing through said housing into said air reservoir, and a fuel inlet passing through said housing into said fuel reservoir.

11. The engine of claim 10, wherein compressed air is supplied to said injector through said air inlet.

12. The engine of claim 1, wherein said fuel conduit has a first end with at least one orifice therein located in said fuel reservoir, and a second end connected to said venturi.

13. The engine of claim 1, wherein said check valve includes a spring biased valve body.

14. The engine of claim 1, wherein a screen located between said venturi and said check valve spans said chamber.

15. The engine of claim 1, wherein said sensors are metallic and said elements or said drum are magnetically charged.

16. The engine of claim 1, wherein said timing mechanism includes a pulley located on a first end of a shaft attached to said drum, a second pulley attached to said output shaft of said engine, and a belt connecting said pulleys.

17. The engine of claim 1, wherein said timing mechanism is wired to said solenoid of said exhaust valve and said injector.

18. An air/fuel injector for use in charging a cylinder of an engine having a piston therein comprising:

an outer housing having a first closed end and a second open end and having an air reservoir, fuel reservoir, and mixing chamber therein, said mixing chamber extending from within said housing to said second open end thereof;

a passageway connecting said air reservoir with said mixing chamber;

fuel conduit means extending from the fuel reservoir to the mixing chamber;

an air needle having a first end located in said air reservoir for selective closure of said passageway and a second end located outside of the reservoir;

actuating means located at said second end of said air needle for selectively moving said air needle;

a fuel needle having a first end located in said fuel reservoir for selective closure of said fuel conduit;

actuating means located at said second end of said fuel needle for selectively moving said fuel needle;

a venturi located in said mixing chamber, said venturi located proximate said orifice in said air chamber and connected to said fuel conduit; and a check valve located at said second open end of said housing for selectively closing the end of the chamber.

19. A method of operating an internal combustion engine having at least one cylinder with a piston therein, an intake passage leading to said cylinder and an exhaust passage leading therefrom comprising:

providing air to an air reservoir in an injector;

providing fuel to a fuel reservoir in the injector;

moving an air needle out of an orifice in said air reservoir;

moving a fuel needle out of an orifice in said fuel reservoir;

mixing air and fuel passing through said orifices in a venturi;

opening a check valve and allowing said air and fuel to enter said cylinder through said intake passage;

moving a cylindrical exhaust valve body obstructing said exhaust passage to a position in which a bore in said body is aligned with said passage for allowing exhaust gases to escape from said cylinder through said passage.

20. The method of claim 19 wherein said moving of said valve body comprises charging a solenoid linked to said valve body.

21. The method of claim 19, wherein said moving of said air needle causes movement of said fuel needle.

* * * * *